United States Patent [19]

Peterson et al.

[11] Patent Number: 4,866,990

[45] Date of Patent: Sep. 19, 1989

[54] THREADED FASTENER TEST STAND

[75] Inventors: Francis C. Peterson, Woodbury; Mark T. Zabawa, Prospect, both of Conn.

[73] Assignee: Buell Industries, Inc., Waterbury, Conn.

[21] Appl. No.: 265,264

[22] Filed: Oct. 31, 1988

[51] Int. Cl.[4] .......................................... G01M 19/00
[52] U.S. Cl. ..................................... 73/761; 73/865.9
[58] Field of Search ..................... 73/761, 865.8, 865.9

[56] References Cited

U.S. PATENT DOCUMENTS 2,586,708  2/1952  Pertit ..................................... 73/761
4,102,182  7/1978  Brown et al. ......................... 73/761

Primary Examiner—Jerry W. Myracle
Attorney, Agent, or Firm—St. Onge Steward Johnston & Reens

[57] ABSTRACT

A test stand for testing male threaded fasteners comprises a holder for the fastener which locates a rotating male fastener adjacent to a target bore in a target body holder. The target bore is positioned at an angle to the fastener by rotating the target body holder. If the fastener meets manufacturing specifications, it engages the target bore threading and causes the target bore and fastener to become aligned by the rotation of the target body holder. A test stand for testing female fasteners operating in the same way locates a rotating female fastener adjacent a target stud in a target stud holder.

31 Claims, 4 Drawing Sheets

THREADED FASTENER TEST STAND

FIELD OF THE INVENTION

The present invention relates to a test stand for rapidly testing fasteners for conformance with manufacturing specifications.

BACKGROUND OF THE INVENTION

The precision manufacture of fasteners such as screws and the like having special features such as an anti-cross threading tip requires stringent quality control standards. The usual and established method for determining whether a part such as a fastener is manufactured within its specifications is to use an optical comparator. In an optical comparator, the part is place on a projector which projects a magnified silhouette of the part onto a screen. The screen has mounted on it a transparency prepared for the particular part in which the nominal part size and the allowable tolerances are shown at the appropriate magnification. Typically both the transparency and the part are magnified to ten times their normal size. The magnified projected silhouette of the part is compared against the standards shown on the projected transparency to determine if the part meets the manufacturing specifications.

The disadvantage of the optical comparator is that it is a very time consuming process to set up and make the comparison of the manufactured part with the standards.

It is desirable therefore, to provide a testing apparatus which obviates the need for visual comparisons between a manufactured part and its specification. Further it is desirable to test the manufactured part directly for its intended function.

SUMMARY OF THE INVENTION

It is an object of the present invention to provide a test stand that allows a rapid quality control check of threaded fasteners for conformance with manufacturing specifications. It is another object of the present invention to provide a test stand that allows a rapid quality control check of the functioning of anti-cross threading threaded fasteners for conformance with manufacturing specifications. It is another object of the invention to provide a test stand adapted to test both male and female fasteners.

These objects, and other objects which will become apparent from the description that follows, are achieved by a test stand for testing an anti-cross threading fastener generally comprising a target threaded fastener having a longitudinal axis and being sized and adapted to mate with the anti-cross threading fastener; means for rotating the anti-cross threading fastener around its longitudinal axis and for locating the anti-cross threading fastener adjacent to the target fastener; means for adjusting the relative positions of the anti-cross threading fastener and the target fastener such that the longitudinal axis of the anti-cross threading fastener is at an angle to the longitudinal axis of the target fastener when they are located adjacent each other; and means for permitting the longitudinal axes of the anti-cross threading fastener and the target fastener to align if the anti-cross threading fastener is in conformance within predetermined specifications.

As adapted to test an anti-cross threading male fastener, the test stand comprises: a target body in which is formed a threaded target bore sized to receive the fastener to be tested and having a longitudinal axis; means for rotating the fastener around its longitudinal axis and locating its engaging end adjacent to the target bore; means for adjusting the relative positions of the fastener and the target bore such that the longitudinal axis of the fastener is at an angle to the longitudinal axis of the target bore when the engaging end of the fastener encounters the target bore; and means for permitting the longitudinal axes of the fastener and target bore to align if the fastener conforms with predetermined specifications. A cover plate, having an aperture larger in diameter than the target bore, may overlay the target body.

As adapted to test a female anti-cross threading fastener, the test stand comprises: a threaded target stud having an engaging end sized to fit inside the female fastener; means for rotating the female fastener around its longitudinal axis and for locating the female fastener adjacent to the engaging end of the target stud; means for adjusting the relative positions of the female fastener and the target stud such that the longitudinal axis of the female fastener is at an angle to the longitudinal axis of the target stud when the engaging end of the target stud first encounters the female fastener; and means for permitting the longitudinal axes of the female fastener and the target stud to align if the female fastener is in conformance within predetermined specifications.

The means for rotating the anti-cross threading fastener around its longitudinal axis and locating its engaging end adjacent to the target fastener preferably comprises a socket sized to receive the anti-cross threading fastener; means for retaining the anti-cross threading fastener in the socket; means for rotating the socket; a framework on which is mounted the rotating means, socket and retaining means; and means for moving the framework in a plane to place the anti-cross threading fastener adjacent to the target fastener.

The means for adjusting the position of the anti-cross threading fastener relative to the target fastener such that the axis of the anti-cross threading fastener is at an angle to the axis of the target fastener and the means for permitting the longitudinal axes of the anti-cross threading fastener and target fastener to align preferably comprises a target fastener holder which is rotatable around an axis perpendicular to the longitudinal axis of the target fastener.

Means for determining if the longitudinal axes of the target fastener and the anti-cross threading fastener have aligned within predetermined tolerances may be provided, and preferably comprises means for measuring the angle between the longitudinal axis of the target fastener and the longitudinal axis of the anti-cross threading fastener; for example, the measuring means preferably comprises an indicator attached to one end of the rotatable target fastener holder, and a fixed scale attached to a base, whereby the amount of rotation is determinable by reading the change in position of the indicator against the fixed scale and reflects the angle between the longitudinal axes of the anti-cross threading fastener and target fastener.

Means for limiting rotation of the target fastener holder beyond a setpoint may be provided and preferably comprises a target lever with a set screw which is adapted to be engaged by a stop mounted on the base.

Means for adjusting the force required to cause the target fastener holder to rotate may be provided and preferably comprises a weight located at a radial distance from the axis of rotation of the target fastener holder and attached thereto by a rigid rod.

DESCRIPTION OF THE PREFERRED EMBODIMENT

Figure 1:
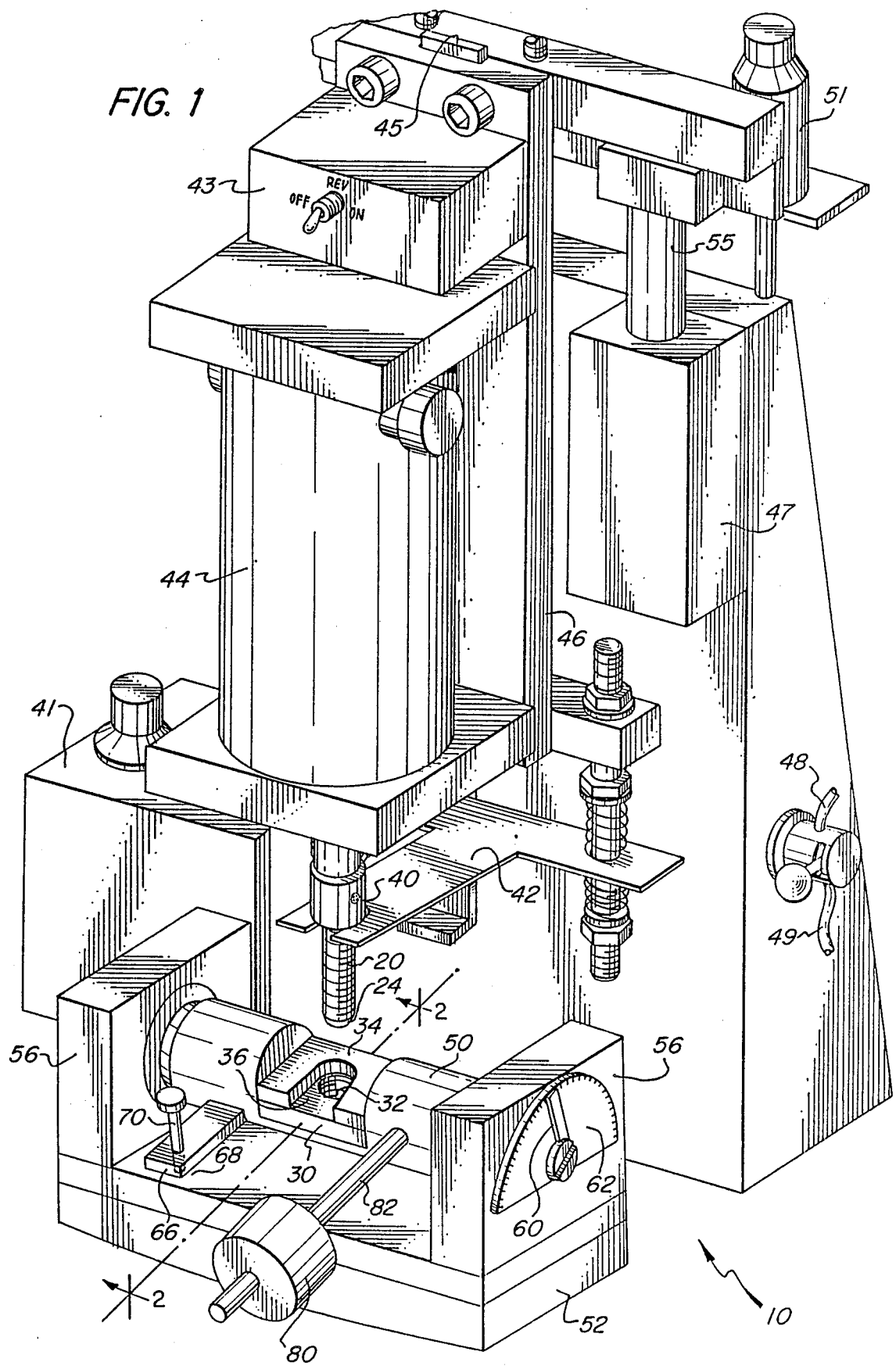
FIG. 1 is a perspective view of an embodiment of the test stand of the present invention adapted to test a male anti-cross threading fastener.

The test stand of the present invention is adapted particularly to test anti-cross threading male fasteners of the types disclosed in copending and commonly owned U.S. patent applications No. 034,010, entitled "Anti-Cross Threading Screw" and filed Apr. 2, 1987, now U.S. Pat. No. 4,789,288 in the names of Francis C. Peterson and Jeffrey C. Bergren and U.S. patent application Ser. No. 234,891, entitled "Anti-Cross Threading Fastener" and filed Aug. 22, 1988 in the names of Francis C. Peterson and Jeffrey C. Bergren, the disclosures of which are hereby incorporated by reference in their entirety, as well as female anti-cross threading fasteners of the type disclosed in copending and commonly owned U.S. patent application No. 230,589, entitled "Anti-Cross Thread Nut" and filed Aug. 10, 1988 in the name of Francis C. Peterson, the disclosure of which is incorporated by reference in its entirety.

Anti-cross threading fasteners demonstrate the ability to align themselves with the matching threaded fasteners with which they are fitted. Thus the male and female fasteners need not be in precise axial alignment when they are torqued together, even when using power tools, since the self-aligning qualities of the anti-cross threading fastener will cause the parts to match up and thread together.

It is this self-aligning quality which the present invention is intended to test. If the tested sample does not demonstrate self-aligning ability based on the major parameters for measuring self-alignment, namely, the angle of insertion of the male fastener into the bore of a female fastener, and the force required to move either or both of the male and female fasteners into alignment with each other, then it has not met the manufacturing specifications for an anti-cross threading fastener. Other parameters which influence the self-aligning ability are the rotational speed of a fastener, the speed and force with which the fasteners approach each other, and these other parameters may be varied in the test stand of the present invention.

The operation of the test stand of the present invention is based on locating a rotating anti-cross threading fastener adjacent to a target fastener at an selected angle and a selected resistance to movement, and to see whether the fasteners will successfully thread together. In the preferred embodiment, the rotating fastener, male or female, is the anti-cross threading fastener, and target fastener, which is not rotating, is a standard matching threaded fastener. However, the opposite orientation may also be used and a rotating standard fastener may be presented to a stationary anti-cross threading fastener in accordance with the invention.

With reference to FIGS. 1-5, a test stand, shown generally at 10, is adapted to test an anti-cross threading male fastener 20 having a head and an engaging end 24 for self-alignment qualities.

Test stand 10 comprises a target body 30 in which is formed a threaded target bore 32 which is sized to receive fastener 20. Bore 32 has a longitudinal axis A–A.

In order to emulate the normal conditions of use of a threaded fastener, a cover plate 34 overlaying the target body 30 having an aperture 36 larger in diameter than the diameter of the target bore 32 may be provided. The cover plate 34 emulates a part or parts which would be fastened by a fastener when the fastener is threaded into a bore in the normal conditions of use of such fasteners.

Means for rotating fastener 20 around its longitudinal axis B—B and locating the fastener engaging end 24 adjacent to target bore 32 is provided. The means for rotating and locating preferably comprises a socket 40 together with a means for retaining the fastener in the socket, means for rotating the socket, and a framework on which is mounted the rotating means, socket and retaining means, and means for moving the framework in a plane to place said fastener adjacent to the target bore 32.

The socket 40 is sized to receive the head of fastener 20. The retaining means may be provided by magnetizing the socket 40 such that it holds the fastener 20 in it. Alternatively, a mechanical retaining means, such as the forked member 42 which has spring qualities at its forked end to urge the fastener into the socket, may be used.

The means for rotating said socket preferably comprises any number of powered tools such as electric or pneumatic rotating tools. Preferably, the powered tool has speed and torque characteristics that are similar to the tools being used with the threaded fastener in actual assembly line use. The powered tool is preferably a reversing tool such that the fastener may be withdrawn from the target bore. In FIG. 1, the rotating means comprises a variable speed electric motor 44 having an electrical controller 41 and a switch box 43, providing variable speeds up to a maximum speed of approximately 1900 revolutions per minute.

Figure 4:
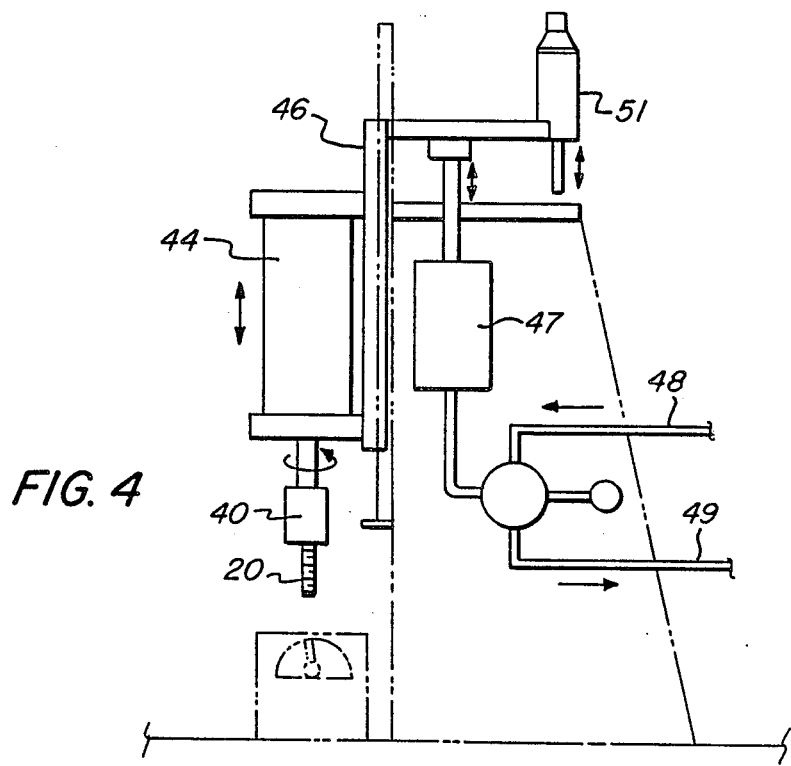
FIG. 4 is a schematic view of an embodiment of the means for locating the fastener adjacent the target bore.
Figure 5:
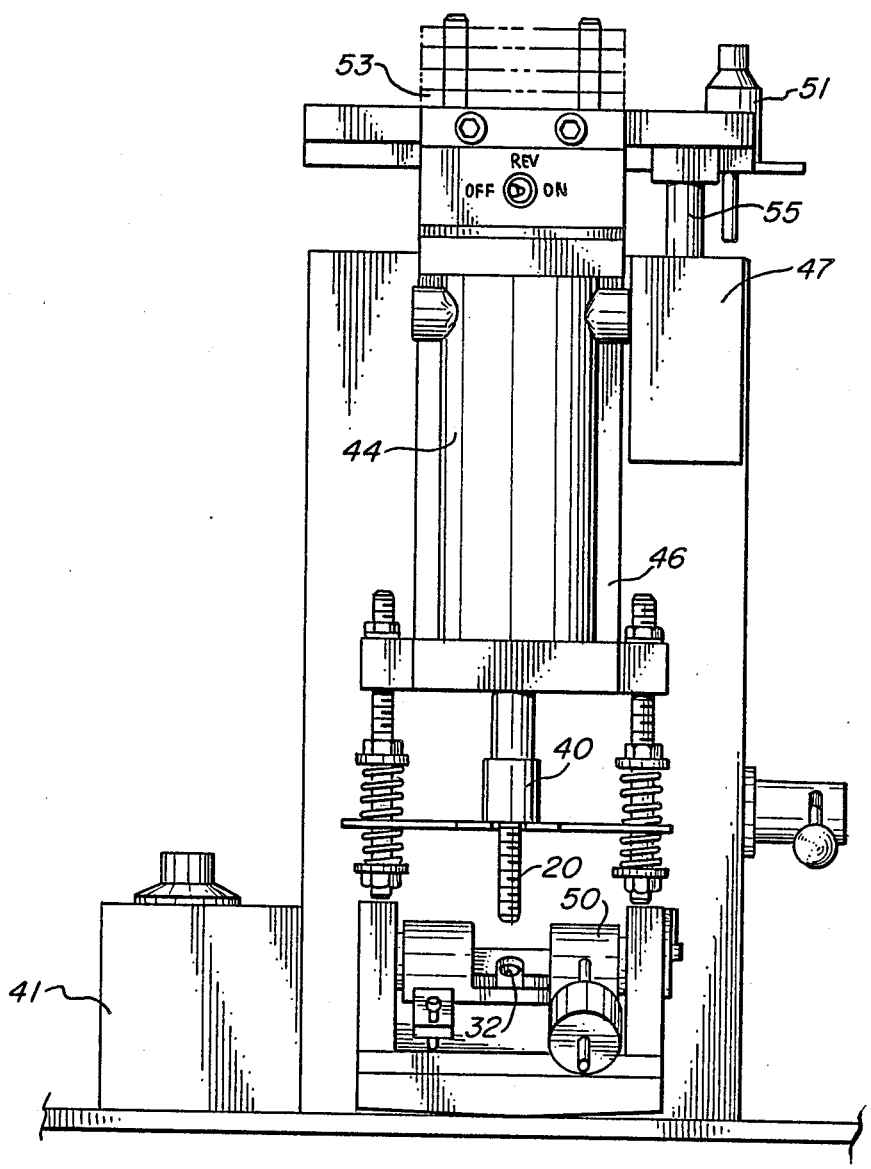
FIG. 5 is a front plan view of an embodiment of the test stand of the present invention adapted to test a male anti-cross threading fastener.

The socket 40, retaining means, and electric motor 44 are mounted on a framework 46. The framework is adapted to move up and down, for example by engaging a vertical rail 45. Means for moving framework 46 in a plane is provided to place fastener 20 adjacent to the target bore 32. The moving means may be activated by gravity, electricity, pneumatics or hydraulics. In a preferred embodiment as shown in FIG. 4, the moving means comprises a valved pneumatic cylinder 47 having a piston 55 adapted to raise the framework 46 when pressurized air is fed into it through inlet line 48, and to lower the framework 46 when the cylinder 47 is depressurized through exhaust line 49. A hydraulic cylinder 51 having a flow controller is provided so that the fastener 20 can be made to approach the target bore at a selected speed when the pneumatic cylinder 47 is exhausted. Preferably the hydraulic cylinder 51 is affixed to the moving framework 46, and has a piston which interacts with a stationary surface to provide a controlled drop rate. A weight or weights may be provided in or on the framework 46, for example, on platform 53, as shown in FIG. 5, to increase the force with which the rotating fastener 20 approaches the target bore 32.

Means for adjusting the relative positions of fastener 20 and target bore 32 such that the axis A-A is at an angle to axis B—B is provided. The adjusting means may allow for positioning of either or both the fastener 20 and the target bore 32 relative to the other. For example, either or both the fastener 20 and its rotating and locating means and the target body 30 may be mounted on gimballed frames allowing movement of each on the axes x, y, and z of three dimensional space. However, the simpler design of the embodiment shown in the Figures is equally effective and provide a more economical structure to manufacture and use. In the embodiment shown in the FIGURES, the fastener 20 is held in a vertical position and is only allowed linear movement along a vertical axis. The target body 30 is held in a target body holder 50 which allows rotation around a single axis. Of course, movement of these parts may be provided in other ways, for example, by providing the target bore with linear movement along an axis and providing the fastener with a range of movement in a plane intersecting the target bore axis.

Means for permitting the longitudinal axes of the target bore 32 and fastener 20 to align is also provided so that if the fastener 20 is in conformance with predetermined specifications, the target bore 32 and fastener 20 will be able to thread together.

The means for permitting the longitudinal axes of the fastener 20 and target bore 32 to align preferably comprises a rotatable target body holder 50, which allows the target bore 32 to move so that the axes A—A and B—B can align, allowing the fastener 20 and target bore 32 to thread together The target body holder 50 is rotatable around an axis perpendicular to the axis A—A of the target bore 32. The target body holder 50 may be held in a base 52. In the preferred embodiment, the target body holder 50 is generally cylindrical and the ends of the target body holder 50 are fitted into the arms 56 of the base 52. The target body holder 50 and the arms 56 may be provided with any means for allowing the target body holder 50 to rotate as are known in the art, ranging from roller bearings to a simple fitting together of an axle into holes in the arms 56.

Means for determining if the longitudinal axes of the target bore 32 and fastener 20 have aligned within predetermined tolerances is provided. This determining means preferably comprises means for measuring the angle between the axis B—B of target bore 32 and the axis A—A of fastener 20, which may be provided by a measurement of the amount of rotation of target body holder 50 relative to the axis A—A of fastener 20. For example, an indicator 60 attached to one end of the target body holder 50 can be used in conjunction with a fixed scale 62 attached to the base 52. The amount of rotation can be determined by the change in position of the indicator 60 relative to the fixed scale 62. In the FIGURES, fixed scale 62 is marked in degrees so that a degree measurement of rotation may be obtained. For convenience, the vertical axis in which the fastener 20 travels is selected as the nominal zero degree point. Although the embodiment shown in the drawings employs a purely mechanical reading of rotation, of course other measuring means may be employed, for example, a potentiometer may be installed in one end of the target body holder and calibrated to give a measurement of rotation. Other measuring devices for determining position or rotation as are known in the art may also be used.

Means for limiting rotation of the target body holder 50 beyond a setpoint is provided so that the target body holder can be held in a selected position to provide an angle between axes A—A and B—B. In the preferred embodiment, the means for limiting rotation comprises a target lever 66 having a set screw 70 which engages a stop 68 mounted on the base 60. The target lever 66 is mounted on the target body holder 50. The set screw 70 meets with and engages the stop 68 at the selected angle, and prevents the target body holder 50 from rotating any further. Adjustment of the angle between the axes is provided by moving the set screw 70 in and out of a threaded bore in the stop lever 66.

Means for adjusting the force required to cause the target body holder 50 to rotate is provided. This force adjusting means may comprise a frictional device mounted on the base 52 and which frictionally engages the target body holder 50, or it may take other embodiments. In the preferred embodiment, the means for adjusting the force required to cause the target body holder 50 to rotate comprises a weight 80 located at a radial distance from the axis of rotation of the target body holder 50 and attached thereto by a rigid rod 82. By varying the position of the weight 80 along the rod 82 a variation of the inertia of the target body holder 50 and of the force required to cause the target body holder 50 to rotate is obtained.

Figure 2:
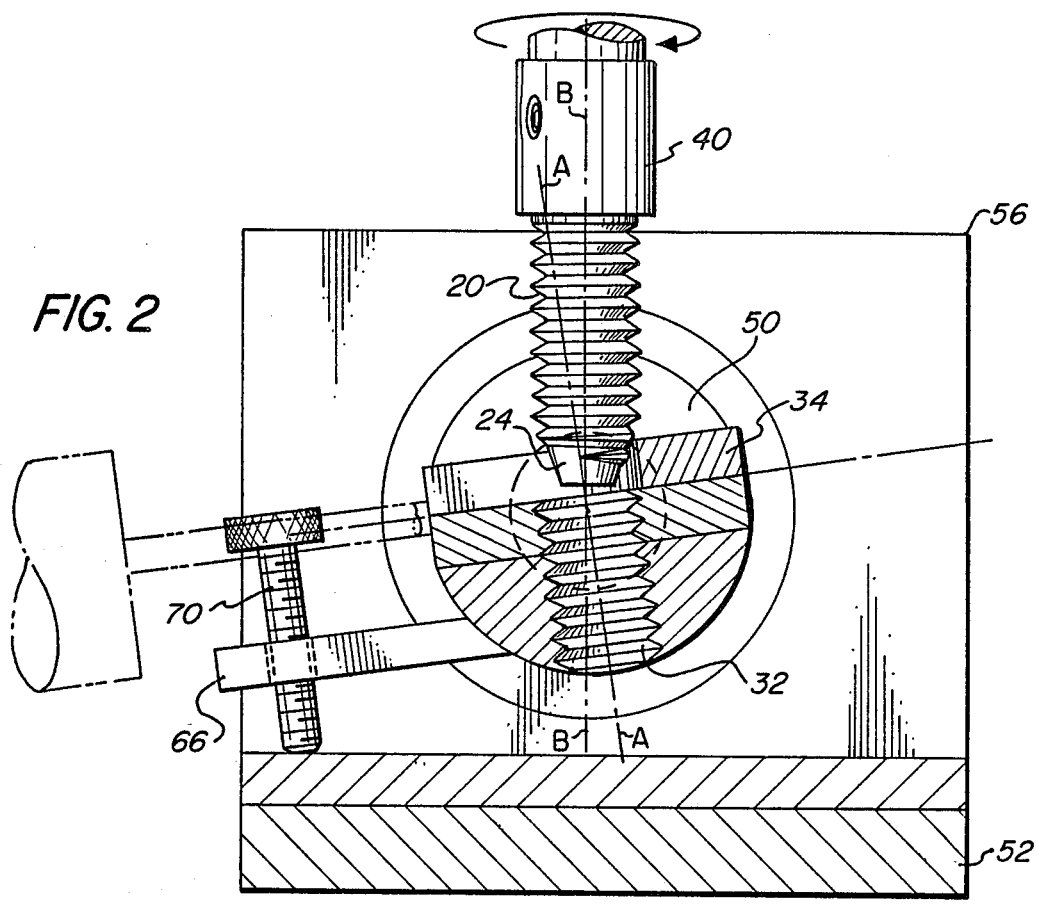
FIG. 2 is a cross-sectional view of the target body and target body holder along the line 2—2 of FIG. 1, showing the fastener as it approaches the target body.
Figure 3:
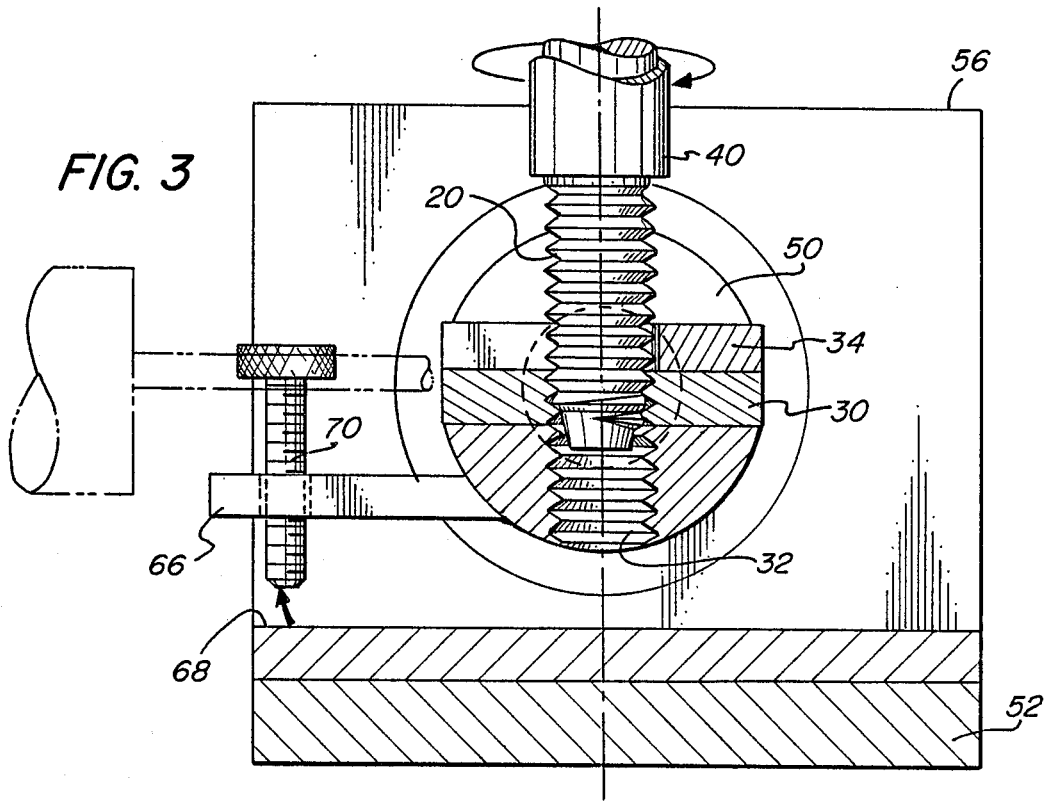
FIG. 3 is a cross-sectional view of the target body and target body holder as shown in FIG. 2 after the fastener has mated with the target bore in the target body.

The use of the test stand of the present invention is shown in FIGS. 2 and 3. In FIG. 2, the rotating fastener 20 is shown as it approaches the target bore 32 of target body 34 mounted in the rotatable target body holder 50. As can be seen, the fastener axis B—B is at an angle to the target bore axis A—A, which angle is provided by adjusting the set screw 70 to select an angle measurable on the scale 62. As the fastener 20 is inserted into the target bore 32, the threads of the fastener 20 pilot into the hole and engage the threads of the target bore 32, causing the target body holder 50 to rotate such that the axes of the fastener 20 and the target bore 32 are aligned and the fastener 20 is threaded into the target bore 32.

If the fastener fails to engage the threads of the threaded bore 32, the target body will not rotate back to the zero degree position and, thus, the fastener will be unacceptable for failing to meet this manufacturing standard.

Figure 6:
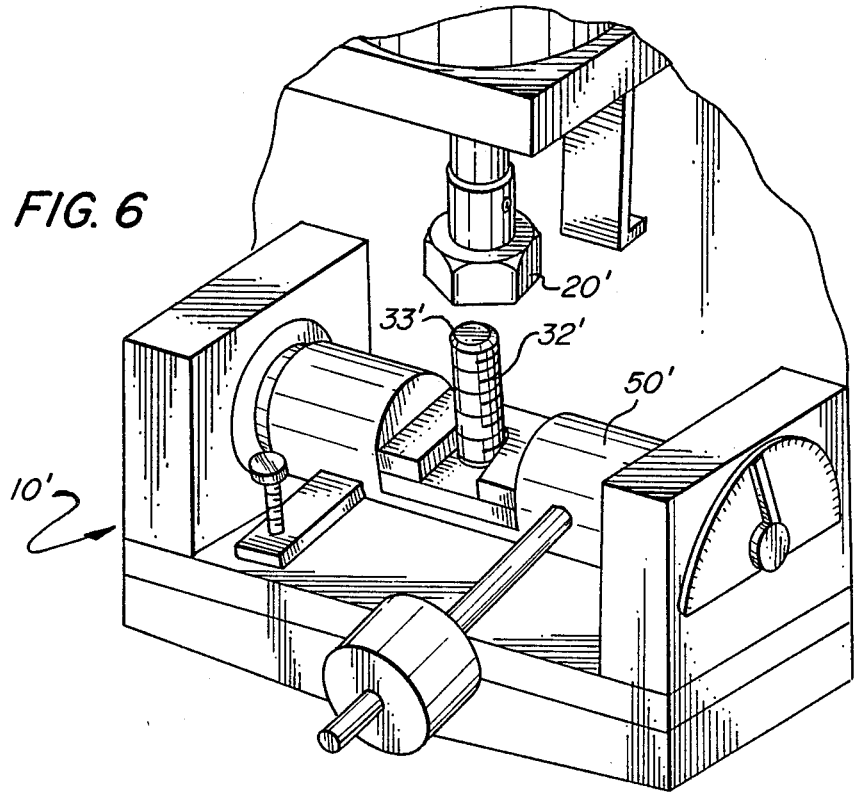
FIG. 6 is a perspective view of an embodiment of the invention adapted to test a female anti-cross threading fastener.

The same test stand may be used for testing a female anti-cross thread fastener such as a nut 20', shown in FIG. 6, which is brought into contact with a threaded stud 32' having an engaging end 33', which extends from the target stud holder 50'. Except for this change, the rest of the test stand 10' comprises the same basic elements as described above for a test stand 10 for testing a male threaded fastener 20 for conformance with manufacturing specifications.

Therefore, the present invention provides a inexpensive direct test of the function of an anti-cross threading fastener, and improves over standard quality control procedures for testing fasteners for conformance with manufacturing specifications.

We claim:

1. A test stand for testing an anti-cross threading male fastener having a head and an engaging end at opposite ends of its longitudinal axis, for compliance with manufacturing specifications, comprising:
- a target body;
- a threaded target bore formed in said target body sized to receive said fastener and having a longitudinal axis;
- means for rotating said fastener around its longitudinal axis and for locating the engaging end of said fastener adjacent to said target bore;
- means for adjusting the relative positions of said fastener and said target bore such that the longitudinal axis of said fastener is at an angle to the longitudinal axis of said target bore when the engaging end of said fastener first encounters said target bore; and
- means for permitting said longitudinal axes of said fastener and said target bore to align if said fastener is in conformance within predetermined specifications.

2. A test stand in accordance with claim 1 further comprising a cover plate overlaying said target body, said cover plate having an aperture larger in diameter than said target bore.

3. A test stand in accordance with claim 1 wherein said means for adjusting the relative positions of said fastener and said target bore such that the longitudinal axis of said fastener is at an angle to the longitudinal axis of said target bore and said means for permitting said longitudinal axes to align comprise:
- a rotatable target body holder, said target body being mounted on a surface of said target body holder facing said fastener, said target body holder being rotatable around an axis perpendicular to the longitudinal axis of said target bore.

4. A test stand in accordance with claim 3, further comprising means for determining whether the longitudinal axes of said target bore and said fastener have aligned within predetermined tolerances.

5. A test stand in accordance with claim 4, wherein said means for determining whether the longitudinal axes of said target bore and said fastener have aligned within predetermined tolerances comprises means for measuring the angle between the longitudinal axis of said target bore and the longitudinal axis of said fastener.

6. A test stand in accordance with claim 5, wherein said means for measuring the angle between said longitudinal axes comprises an indicator attached to one end of said rotatable target body holder, and a fixed scale, whereby the amount of rotation is determinable from said fixed scale by the change in position of said indicator.

7. A test stand in accordance with claim 3, further comprising:
- means for limiting rotation of said target body holder beyond a setpoint.

8. A test stand in accordance with claim 7, wherein said means for limiting rotation of said target body holder beyond a setpoint comprises:
- a target lever mounted on said target body holder, said target lever having a threaded bore therein, and a set screw fitted into said threaded bore;
- a stop adapted to engage said set screw.

9. A test stand in accordance with claim 3, further comprising means for adjusting the force required to cause said target body holder to rotate.

10. A test stand in accordance with claim 9, wherein said means for adjusting the force required to cause said target body holder to rotate comprises a weight located at a radial distance from the axis of rotation of said target body holder and attached thereto by a rigid rod.

11. A test stand in accordance with claim 1, wherein said means for rotating said fastener around its longitudinal axis and locating the engaging end of said fastener adjacent to said bore comprises:
- a socket sized to receive the head of said fastener;
- means for retaining said fastener in said socket;
- means for rotating said socket;
- a framework on which is mounted said rotating means, socket and retaining means; and
- means for moving said framework in a plane to place said fastener adjacent to said target bore.

12. A test stand for testing an anti-cross threading male fastener having a head and an engaging end at opposite ends of its longitudinal axis, for compliance with manufacturing specifications, comprising:
- a target body;
- a threaded target bore formed in said target body sized to receive said fastener, said target bore having a longitudinal axis;
- a cover plate overlaying said target body, said cover plate having an aperture larger in diameter than said target bore;
- means for rotating said fastener around its longitudinal axis and locating the engaging end of said fastener adjacent to said target bore; and
- a rotatable target body holder, said target body being mounted on a surface of said target body holder facing said fastener, said target body holder being rotatable around an axis perpendicular to the longitudinal axis of said target bore;
- a base in which is held said rotatable target body holder;
- means for determining whether the longitudinal axis of said target bore and the longitudinal axis of said fastener have aligned within predetermined tolerances;
- means for limiting rotation of said target body holder beyond a setpoint; and
- means for adjusting the force required to cause said target body holder to rotate.

13. A test stand in accordance with claim 12, further comprising means for measuring the angle between the longitudinal axis of said target bore and the longitudinal axis of said fastener.

14. A test stand in accordance with claim 13, wherein said means for measuring the angle between the longitudinal axis of said target bore relative to the longitudinal axis of said fastener comprises means for measuring the amount of rotation of said target body holder relative to the longitudinal axis of said fastener.

15. A test stand in accordance with claim 14, wherein said means for measuring the amount of rotation of said target body holder comprises an indicator attached to one end of said rotatable target body holder and a mixed scale attached to said base, and whereby the amount of rotation is determinable from said fixed scale by the change in position of said indicator.

16. A test stand in accordance with claim 12, wherein said means for limiting rotation of said target body holder beyond a setpoint comprises:
- a target lever mounted on said target body holder, said target lever having a threaded bore therein, and a set screw fitted into said threaded bore; and
- a stop located on said base adapted to engage said set screw.

17. A test stand in accordance with claim 12, wherein said means for adjusting the force required to cause said target body holder to rotate comprises a weight located at a radial distance from the axis of rotation of said target body holder and attached thereto by a rigid rod.

18. A test stand for testing an anti-cross threading fastener for compliance with manufacturing specifications in accordance with claim 12, wherein said means for rotating said fastener around its longitudinal axis and locating the engaging end of said fastener adjacent to said bore comprises:
   a socket sized to receive the head of said fastener;
   means for retaining said fastener in said socket;
   means for rotating said socket;
   a framework on which is mounted said rotating means, socket and retaining means; and
   means for moving said framework in a plane to place said fastener adjacent to said target bore.

19. A test stand for testing an anti-cross threading female fastener for compliance with manufacturing specifications, comprising:
   a threaded target stud having a longitudinal axis, said stud having an engaging end sized to fit inside said female fastener;
   means for rotating said female fastener around its longitudinal axis and for locating said female fastener adjacent to the engaging end of said target stud;
   means for adjusting the relative positions of said female fastener and said target stud such that the longitudinal axis of said female fastener is at an angle to the longitudinal axis of said target stud when the engaging end of said target stud first encounters said female fastener; and
   means for permitting said longitudinal axes of said female fastener and said target stud to align if said female fastener is in conformance within predetermined specifications.

20. A test stand in accordance with claim 19 wherein said means for adjusting the relative positions of said female fastener and said target stud such that the longitudinal axis of said female fastener is at an angle to the longitudinal axis of said target stud and said means for permitting said longitudinal axes to align comprise:
   a rotatable target stud holder, said target stud extending from a surface of said target stud holder facing said female fastener, said target stud holder being rotatable around an axis perpendicular to the longitudinal axis of said target stud.

21. A test stand in accordance with claim 20, further comprising:
   means for limiting rotation of said target stud holder beyond a setpoint.

22. A test stand in accordance with claim 21, wherein said means for limiting rotation of said target stud holder beyond a setpoint comprises:
   a target lever mounted on said target stud holder, said target lever having a threaded bore therein, and a set screw fitted into said threaded bore;
   a stop adapted to engage said set screw.

23. A test stand in accordance with claim 20, further comprising means for adjusting the force required to cause said target stud holder to rotate.

24. A test stand in accordance with claim 23, wherein said means for adjusting the force required to cause said target stud holder to rotate comprises a weight located at a radial distance from the axis of rotation of said target stud holder and attached thereto by a rigid rod.

25. A test stand in accordance with claim 19, further comprising means for determining whether the longitudinal axes of said target stud and said female fastener have aligned within predetermined tolerances.

26. A test stand in accordance with claim 25, wherein said means for determining whether the longitudinal axes of said target stud and said female fastener have aligned within predetermined tolerances comprises means for measuring the angle between the longitudinal axis of said target stud and the longitudinal axis of said female fastener.

27. A test stand in accordance with claim 26, wherein said means for measuring the angle between said longitudinal axes comprises an indicator attached to one end of said rotatable target stud holder, and a fixed scale, and whereby the amount of rotation is determinable from said fixed scale by the change in position of said indicator.

28. A test stand in accordance with claim 19, wherein said means for rotating said female fastener around its longitudinal axis and locating said female fastener adjacent to the engaging end of said stud comprises:
   a socket sized to receive said female fastener;
   means for retaining said female fastener in said socket;
   means for rotating said socket;
   a framework on which is mounted said rotating means, socket and retaining means; and
   means for moving said framework in a plane to place said female fastener adjacent to said target stud.

29. A test stand for testing an anti-cross threading fastener having a longitudinal axis, for compliance with manufacturing specifications, comprising:
   a target threaded fastener, said target fastener having a longitudinal axis and being sized and adapted to mate with said anti-cross threading fastener;
   means for rotating said anti-cross threading fastener around its longitudinal axis;
   means for locating said anti-cross threading fastener adjacent to said target fastener;
   means for adjusting the relative positions of said anti-cross threading fastener and said target fastener such that the longitudinal axis of said anti-cross threading fastener is at an angle to the longitudinal axis of said target fastener when they are located adjacent each other; and
   means for permitting said longitudinal axes of said anti-cross threading fastener and said target fastener to align if said anti-cross threading fastener is in conformance within predetermined specifications.

30. A test stand in accordance with claim 29, wherein said anti-cross threading fastener comprises a female fastener, and wherein said target fastener comprises a male fastener.

31. A test stand in accordance with claim 29, wherein said anti-cross threading fastener comprises a male fastener, and said target fastener comprises a female fastener.

* * * * *